United States Patent
Keith et al.

(10) Patent No.: US 8,300,497 B1
(45) Date of Patent: Oct. 30, 2012

(54) METHOD FOR REDUCING FLOW INDUCED VIBRATION AND NOISE IN TOWED ARRAYS

(75) Inventors: William L. Keith, Ashaway, RI (US); Kimberly M. Cipolla, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 481 days.

(21) Appl. No.: 12/728,454

(22) Filed: Mar. 22, 2010

(51) Int. Cl.
*G01V 1/38* (2006.01)
(52) U.S. Cl. ............. 367/20; 367/15; 367/21; 367/106; 367/130
(58) Field of Classification Search .......... 367/15, 367/20, 21, 106, 130
See application file for complete search history.

(56) References Cited

U.S. PATENT DOCUMENTS

| | | | | |
|---|---|---|---|---|
| 4,581,723 | A * | 4/1986 | Savit | 367/20 |
| 6,058,072 | A * | 5/2000 | Abraham | 367/20 |
| 7,548,486 | B2 * | 6/2009 | Tenghamn | 367/20 |

* cited by examiner

*Primary Examiner* — Isam Alsomiri
*Assistant Examiner* — Daniel L Murphy
(74) *Attorney, Agent, or Firm* — James M. Kasiscke; Michael P. Stanley; Jean-Paul A. Nasser

(57) ABSTRACT

A method for reducing noise in a towed acoustic array includes providing a towed array having a length, diameter, frequency range and tow speed. The relationship between tension in the towed array and wall pressure fluctuation spectral levels is determined. Wall pressure fluctuation spectral levels are related to the noise in the array. An optimal towed array tension is calculated using the determined relationship. Tension is increased to the optimal towed array tension by either provided additional towed array hose or a drogue at the end of the towed array.

6 Claims, 3 Drawing Sheets

METHOD FOR REDUCING FLOW INDUCED VIBRATION AND NOISE IN TOWED ARRAYS

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED PATENT APPLICATIONS

None.

BACKGROUND OF THE INVENTION (1) Field of the Invention

The present invention generally relates to a towed acoustic sensor array. More particularly, this invention relates to a method for operating a towed acoustic sensor array.

(2) Description of the Prior Art

Naval vessels and geophysical exploration vessels routinely deploy towed acoustic arrays for analyzing undersea structures and objects. Improving signal to noise ratio is critical for these array. This can be increased by decreasing noise sources in the towed acoustic array. A standard towed array deployment is shown in FIG. 1. A tow vessel 10 is provided having a tow cable 12 joined to a towed array 14. Towed array 14 is below a water surface 16. As tow vessel 10 moves in the direction indicated by arrow 18 with velocity V, the towed array 14 is subjected to surface friction along length $L_1$ creating a force F in the direction shown by arrow 20. This results in a tension in towed array 14. It is understood that tow vessel 10 can be a surface or subsurface vessel.

Flow noise is an important component of towed array noise. Flow noise in towed arrays can result from bulge waves and extensional waves propagating in the hose wall, and also from convective energy due to the turbulent boundary layer. These all have a well defined distribution of energy across stream-wise wavenumber at a given frequency, and also a well defined propagation speed.

The turbulent boundary layer developed over the surface of a towed array and vortex shedding induced during turns, are primary sources of flow noise. Standard towed array design is aimed at filtering energy from the turbulent boundary layer using a combination of hydrophone size, hydrophone grouping, and the stand-off distance between the hydrophone and the hose wall of the array. These methods are effective for filtering energy which exists at higher wavenumbers than acoustic energy at low wavenumbers.

FIG. 2 is a diagram of a prior art towed array section 22. Towed array section 22 has a hose wall 24. The hollow interior 26 of hose wall 24 is typically filled with non-conducting oil. Hose wall 24 has an external diameter D as indicated in the figure. A plurality of strength members 28 extend through the hollow interior 26. (For clarity, hidden views of strength members 28 are omitted.) A communications line 30 also extends through the interior 26. Communications line 30 can be either an electrical line or a fiber optic line. Hydrophones 32 are joined to communication line 30 and positioned at intervals within hollow 26. As towed array section 22 is towed through the water a turbulent boundary layer 34 of thickness δ forms around the exterior of hose wall 24.

Therefore, there is a need for reducing flow noise in towed acoustic array.

SUMMARY OF THE INVENTION

A first object of the present invention is to reduce flow noise in a towed acoustic sensor array.

Another object of the present invention is to provide a method for reducing flow noise that results in an array that can be easily handled.

These and other objects are achieved by this method for reducing noise in a towed acoustic array. The method includes providing a towed array having a length, diameter, frequency range and tow speed. The relationship between tension in the towed array and wall pressure fluctuation spectral levels is determined. Wall pressure fluctuation spectral levels generate the noise in the array. An optimal towed array tension is calculated using the determined relationship. Tension is increased to the optimal towed array tension by either provided additional towed array hose or a drogue at the end of the towed array.

Other objects and advantages of the present invention will be apparent from the ensuing description.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DETAILED DESCRIPTION OF THE INVENTION

Recently, tow tests have been performed with a customized experimental towed array instrumented with sensors to measure mechanical and hydrodynamic forces. The wavenumber-frequency spectra measured with internal hydrophones and also with wall pressure sensors mounted in the array hose wall have shown high auto-spectral levels at low frequencies. For purposes of this disclosure, low frequencies are defined as frequencies below 100 Hz. This energy is broadly distributed across all of the measured stream-wise wavenumbers and has no apparent speed of propagation. This type of energy has also been measured with different types of pressure sensors in other towed arrays with different mounting characteristics. Incoherent vibration of the sensors in the array can create this type of energy. Recent measurements made using three axis accelerometers internally mounted in the experimental array showed high auto-spectral levels due to accelerations in the plane orthogonal to the array axis, and somewhat lower spectral levels along the axis, in the low frequency range. Measurements made during tow ship turns showed significant increases in both the pressure and acceleration spectral levels.

Figure 1:
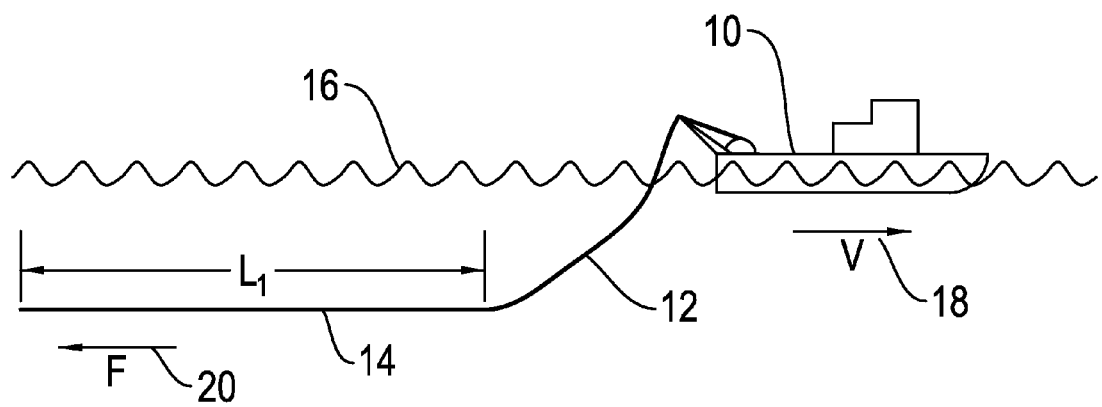
FIG. 1 is a diagram of a prior art tow vessel and towed array.
Figure 2:
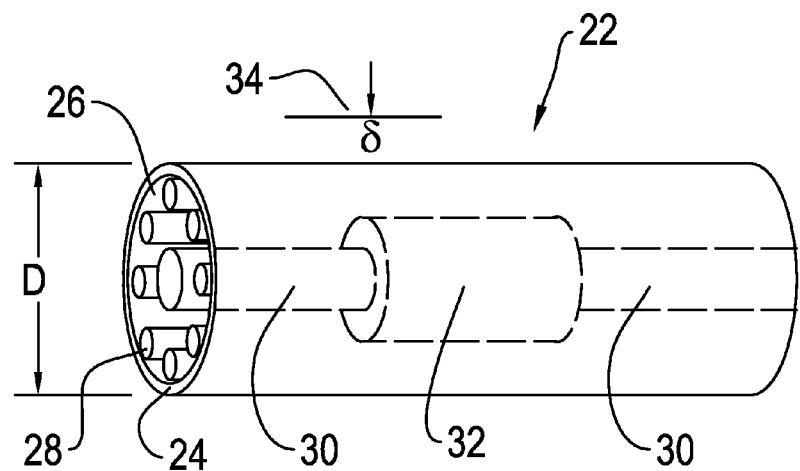
FIG. 2 is a diagram of a section of a prior art towed array.
Figure 3:
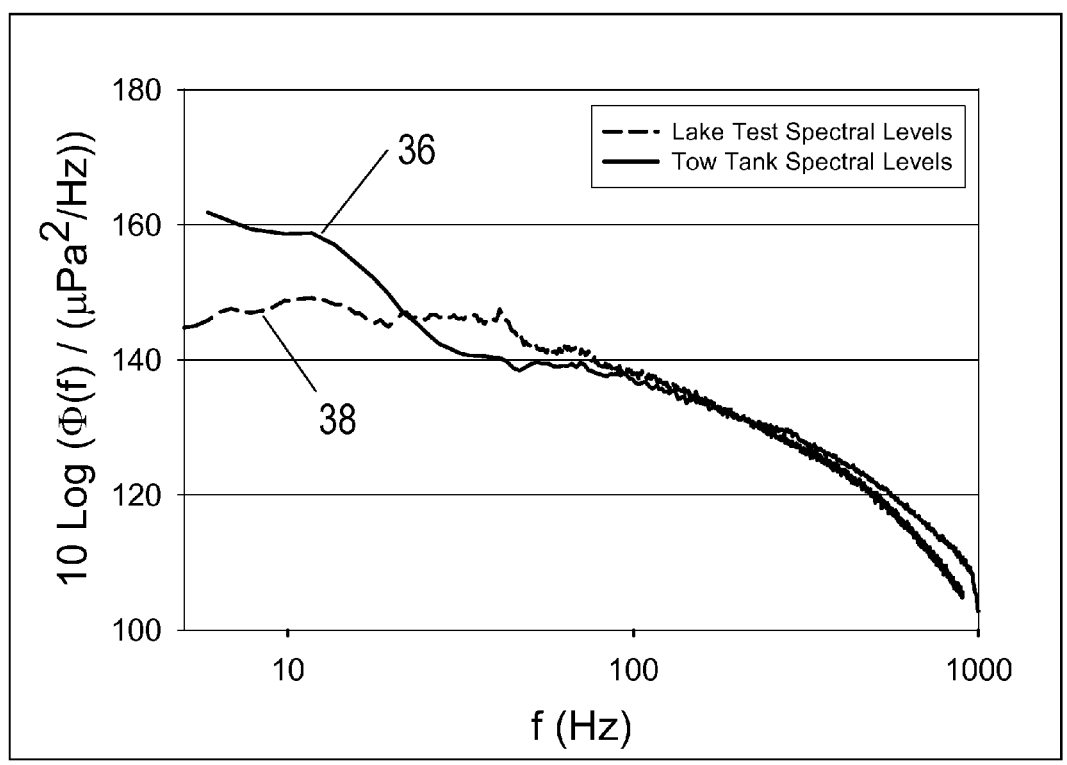
FIG. 3 is a graph showing the autospectra of the direct flow noise in a towed acoustic array.

The recent measurements cited here show flow induced energy which exists across all wavenumbers at lower frequencies. The primary data originated from two tests. FIG. 3 provides a graph of this data. The graph plots spectral energy, $$10\text{Log}\left(\frac{\Phi(f)}{\mu Pa^2}\right)$$

vs. the frequency. A first solid curve identified at 36 was obtained during a test in a tow tank. This test used an array of sensors located 95m from the tow point on the tow carriage. (In the test setup, the tow carriage takes the place of a towing vessel.) The first curve shows data obtained at a towing speed of 12 kts. A second dashed curve identified at 38 was obtained during a test in a lake. The second test also used an array having a sensor 95m from the tow vessel towed at 12 kts. The distinguishing factor between the two tests is that total tension generated in the second test was 20 times larger than that used in the first test. As can be seen from FIG. 3, this results in substantially lower pressure spectral energy levels (15 dB) at frequencies below 20 Hz. Due to the complexity of the construction of the array and the fluid/structure interaction between the array and the turbulence, the mechanisms which lead to this response are presently not clear. However, we propose to utilize this observed phenomenon to reduce and control flow noise by increasing the tension in the array.

Here we propose an algorithm which enables determination of a specified (required) noise reduction for a given array geometry. Parameters include length, diameter, frequency range and nominal tow speed. This algorithm is based on experimental data showing the relationship between array tension T and wall pressure fluctuation spectral levels $\Phi(f)$, which may be given in the form $$\frac{\Phi(f)}{\rho^2 \delta U_o^3} = g(U_o, T, d) \quad (1)$$

where $\rho$=fluid density, $\delta$=turbulent boundary layer thickness, $U_o$=tow speed, and d=array diameter. Here the frequency spectrum $\Phi(f)$ is presented in a standard nondimensional form. The function g is generated empirically from controlled measurements. These relationships can be used to calculate T, the desired towed array tension.

Figure 4:
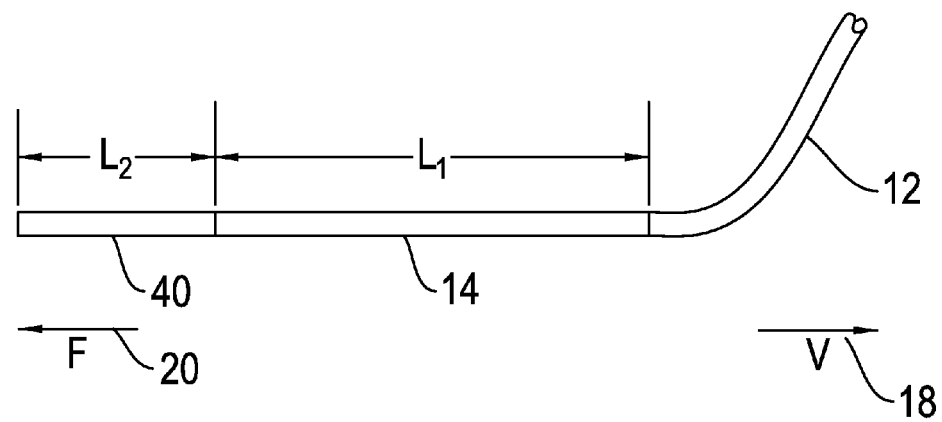
FIG. 4 is a diagram of a first embodiment of the current invention.

FIG. 4 shows a first embodiment of the method for reducing flow noise. FIG. 4 shows tow cable 12 joined to towed array 14. As above, towed array 14 is being towed at velocity V in direction 18. Drag provides a force F in direction 20 on the array 14. In this embodiment, the desired towed array tension is provided by an additional length of towed array hose 40. Unlike array 14, towed array hose 40 doesn't have sensors being used at the operating frequencies affected by this invention. The length $L_2$ is calculated to provide tension $T_2$ as follows:

$$T_2 = \pi d L_2 \tau_m \quad (2)$$

Where $T_2$ is the increased tension due to $L_2$, and $\tau_m$ is the spatially and temporally averaged mean wall shear stress acting over $L_2$. This embodiment has the advantage that additional array hose 40 has similar flow characteristics to array 14. Array hose 40 can also be stowed on a storage reel like the array 14.

Figure 5:
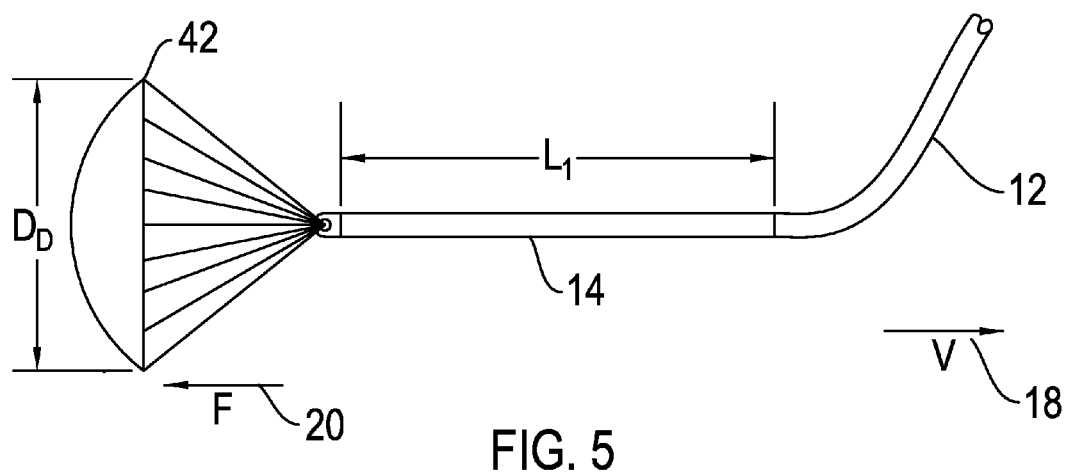
FIG. 5 is a diagram of a second embodiment of the current invention.

FIG. 5 shows a second embodiment of the method for reducing flow noise. As above, FIG. 5 shows tow cable 12 joined to towed array 14. As above, towed array 14 is being towed at velocity V in direction 18. Drag provides a force F in direction 20 on the array 14. Desired towed array tension is provided in this embodiment by a drogue 42. Drogue 42 can be detached from array 14 and stowed separately. This is an advantage when there is limited array storage space or an extra long tow is undesirable. The diameter $D_D$ of drogue 42 provides an elementary calculation of tension, as follows:

$$F_d = C_d \left(\frac{\rho V^2}{2}\right) A \quad (3)$$

Where $F_d$ is force due to drag, the drag coefficient $C_d$ is given by 0.34 for the configuration shown in FIG. 5, $\rho$ is the fluid density, V the tow velocity, and A is the projected cross-sectional area $$\left(\frac{\pi D_D^2}{4}\right)$$

of the array.

Accordingly, this invention should not be limited by any of the specifically shown embodiments. In light of the above, it is therefore understood that within the scope of the appended claims, the invention may be practiced otherwise than as specifically described.

What is claimed is:

1. A method for reducing noise in a towed acoustic array comprising the steps of:
   providing a towed array having a length, diameter, frequency range and tow speed;
   determining the relationship between tension in the towed array and wall pressure fluctuation spectral levels, said wall pressure fluctuation spectral levels being related to the noise;
   calculating an optimal towed array tension using the determined relationship; and
   increasing the tension to the optimal towed array tension in the towed array while the towed array is being towed.

2. The method of claim 1 wherein the step of increasing the tension includes providing a length of additional towed array hose at the end of the towed array, said length of additional towed array hose being calculated to produce additional drag at the tow speed resulting in the optimal towed array tension.

3. The method of claim 2 further comprising the step of providing additional strength members in the provided towed array as necessary for the optimal towed array tension.

4. The method of claim 1 wherein the step of increasing the tension includes providing a drogue at the end of the towed array, said drogue having a geometry calculated to produce additional drag at the tow speed resulting in the optimal towed array tension.

5. The method of claim 4 further comprising the step of providing additional strength members in the provided towed array as necessary for the optimal towed array tension.

6. The method of claim 1 wherein said step of determining the relationship between tension in the towed array and wall pressure fluctuation spectral levels comprises:
   providing a test array having pressure sensors therein and a geometry related to that of the towed array;
   testing said test array;
   measuring tension in said test array during testing;
   recording data from said pressure sensors during testing to determine said wall pressure fluctuation spectral levels in said test array; and
   relating said measured tension to said determined wall pressure fluctuation spectral levels to provide said determined relationship.

\* \* \* \* \*